(12) United States Patent
Koyama et al.

(10) Patent No.: US 11,459,630 B2
(45) Date of Patent: Oct. 4, 2022

(54) BEARING STEEL COMPONENT, AND STEEL BAR FOR BEARING STEEL COMPONENT

(71) Applicant: NIPPON STEEL CORPORATION, Tokyo (JP)

(72) Inventors: Tatsuya Koyama, Tokyo (JP); Kei Miyanishi, Tokyo (JP); Yutaka Neishi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 91 days.

(21) Appl. No.: 16/962,153

(22) PCT Filed: Jan. 22, 2019

(86) PCT No.: PCT/JP2019/001915
§ 371 (c)(1),
(2) Date: Jul. 14, 2020

(87) PCT Pub. No.: WO2019/142946
PCT Pub. Date: Jul. 25, 2019

(65) Prior Publication Data
US 2020/0407816 A1 Dec. 31, 2020

(30) Foreign Application Priority Data
Jan. 22, 2018 (JP) .............................. JP2018-008180

(51) Int. Cl.
*C22C 38/00* (2006.01)
*C22C 38/02* (2006.01)
(Continued)

(52) U.S. Cl.
CPC ............... *C21D 9/40* (2013.01); *C21D 6/004* (2013.01); *C21D 6/005* (2013.01); *C21D 6/007* (2013.01);
(Continued)

(58) Field of Classification Search
CPC ..... C22C 38/001; C22C 38/002; C22C 38/02; C22C 38/06
(Continued)

(56) References Cited

U.S. PATENT DOCUMENTS

| 4,904,094 A | 2/1990 | Furumura et al. |
| 2007/0006944 A1 | 1/2007 | Waseda et al. |

(Continued)

FOREIGN PATENT DOCUMENTS

| JP | 64-55423 A | 3/1989 |
| JP | 2905243 B2 * | 6/1999 |
| JP | 2006-329319 A | 12/2006 |
| JP | 2012-36434 A | 2/2012 |

(Continued)

OTHER PUBLICATIONS

Amano et al., JP 2905243 B2 machine translation, Mar. 3, 2010, entire translation (Year: 2010).*
Zhang Lifeng et al., "Non-metallic Inclusions and Element Segregation in Bearing Steels", Metallurgical Industry Press, p. 12, Jan. 2017.

(Continued)

*Primary Examiner* — Humera N. Sheikh
*Assistant Examiner* — Katherine A Christy
(74) *Attorney, Agent, or Firm* — Solaris Intellectual Property Group, PLLC (57) ABSTRACT

A bearing steel part having a predetermined chemical composition, in which the number density of oxide particles having an equivalent circle diameter of 5 μm or more, and containing CaO, $Al_2O_3$ and $SiO_2$, such that the content ratio of $Al_2O_3$ with respect to the total mass of CaO, $Al_2O_3$, and $SiO_2$ is 50% by mass or more, is $3.0/cm^2$ or less in an arbitrary cross section of the part, and in which the Vickers hardness at a depth of 50 μm from a rolling surface is 750 or more, and in which the compressive residual stress at the rolling surface is 900 MPa or more. Also provided is a steel bar for a bearing steel part that is suitable for obtaining the foregoing bearing steel part.

4 Claims, 1 Drawing Sheet

(51) Int. Cl.

| | |
|---|---|
| *C22C 38/06* | (2006.01) |
| *C21D 9/40* | (2006.01) |
| *C21D 6/00* | (2006.01) |
| *C21D 7/06* | (2006.01) |
| *C22C 38/20* | (2006.01) |
| *C22C 38/24* | (2006.01) |
| *C22C 38/26* | (2006.01) |
| *C22C 38/28* | (2006.01) |
| *C22C 38/30* | (2006.01) |
| *C22C 38/32* | (2006.01) |
| *C22C 38/38* | (2006.01) |
| *C22C 38/44* | (2006.01) |

(52) U.S. Cl.
CPC .............. *C21D 6/008* (2013.01); *C21D 7/06* (2013.01); *C22C 38/001* (2013.01); *C22C 38/002* (2013.01); *C22C 38/005* (2013.01); *C22C 38/008* (2013.01); *C22C 38/02* (2013.01); *C22C 38/06* (2013.01); *C22C 38/20* (2013.01); *C22C 38/24* (2013.01); *C22C 38/26* (2013.01); *C22C 38/28* (2013.01); *C22C 38/30* (2013.01); *C22C 38/32* (2013.01); *C22C 38/38* (2013.01); *C22C 38/44* (2013.01)

(58) Field of Classification Search
USPC ........................................................ 428/544
See application file for complete search history.

(56) References Cited

U.S. PATENT DOCUMENTS

| | | |
|---|---|---|
| 2013/0025747 A1 | 1/2013 | Kubota et al. |
| 2014/0017112 A1 | 1/2014 | Kaizuka et al. |
| 2016/0122841 A1 | 5/2016 | Koyama et al. |

FOREIGN PATENT DOCUMENTS

| | | |
|---|---|---|
| JP | 2012-214829 A | 11/2012 |
| JP | 2014-19911 A | 2/2014 |
| JP | 2015-90207 A | 5/2015 |
| JP | 2016-108599 A | 6/2016 |
| KR | 101474627 B1 | 12/2014 |

OTHER PUBLICATIONS

Zhu Miao-yang et al., "Modem Metallurgical Technology, Volume of Iron and Steel Metallurgy", Metallurgical Industry Press, p. 291, lines 18-21, p. 292, line 11, p. 437-438, Dec. 2016.
English language translation of the following: Office action dated Apr. 14, 2021 from the SIPO in a Chinese patent application No. 201980006780.1 corresponding to the instant patent application. This office action translation is submitted now in order to supplement the understanding of the cited references which are being disclosed in the instant Information Disclosure Statement.
International Search Report for PCT/JP2019/001915 dated Apr. 2, 2019.
Written Opinion of the International Searching Authority for PCT/JP2019/001915 (PCT/ISA/237) dated Apr. 2, 2019.

* cited by examiner

BEARING STEEL COMPONENT, AND STEEL BAR FOR BEARING STEEL COMPONENT

TECHNICAL FIELD

The present disclosure relates to a bearing steel part and a steel bar for a bearing steel part.

BACKGROUND ART

Recently, usage environment of bearing steel parts, for example, for use in automobiles has been getting severer due to parts having been miniaturized and viscosity of lubricant oils having been reduced for improvement of fuel efficiency. In particular, there are cases in which exfoliation occurs starting from a bulging around an indentation formed by a foreign substance, such as an abrasion powder, biting into the bearing steel part, and impairs the bearing function. In order to prevent such a phenomenon, a bearing steel part of which rolling fatigue life in the presence of an indentation (hereinafter referred to as "indentation resistant life") has been improved is desired.

Thus far, Patent Document 1 discloses a technique whereby the occurrence of bulgings around indentations is reduced by increasing the amount of retained austenite on a rolling surface in order to improve the indentation resistant life. In this regard, Patent Document 1 describes that the amount of retained austenite is regulated to a range of from 20% to 45%.

Patent Document 2 discloses that occurrence of micro cracks generated at the time of shot peening is reduced by making milder the shot peening on a bearing steel part, i.e. reducing the compressive residual stress. Patent Document 2 further discloses that reduction in the generation of micro cracks results in improvement in the indentation resistant life.

In addition, Patent Documents 3 to 6 disclose techniques relating to bearing steel parts. Specifically, the techniques are as follows.

Patent Document 3 discloses a rolling bearing in which the square root of the area of the predicted largest oxide inclusion is regulated within a range of from 25 μm to 19.7α+1.2 μm. Patent Document 3 discloses that the regulation of the area of the largest oxide inclusion provides high productivity, reduces internally originating exfoliation, and provides a long life.

Patent Document 4 discloses a steel material for bearing, in which the maximum major diameter of oxide inclusions having a predetermined composition in the longitudinal direction cross-section of the steel material is 20 μm or less, and which has a spheroidal cementite structure. Patent Document 4 further discloses that the regulating of the maximum major diameter of the oxide inclusions provides excellent rolling fatigue characteristics, and enables reduction in early exfoliation.

Patent Document 5 discloses a steel material for bearing, which includes oxide inclusions having an average composition of CaO at from 20 to 45%, $Al_2O_3$ at from 20 to 45%, $SiO_2$ at from 30 to 50%, and $ZrO_2$ at from 2.0 to 10% with respect to the total of CaO, $Al_2O_3$, $SiO_2$, MnO, MgO, and $ZrO_2$ as 100%, and which has a spheroidal cementite structure. Patent Document 5 further discloses that the regulation of the average composition of the oxide inclusions provides excellent rolling fatigue characteristics, and enables reduction in early exfoliation.

Patent Document 6 discloses a steel material for bearing, in which the contents of S and Te in terms of % by mass satisfy the condition, Te/S>0.4, and which has sulfide inclusions formed by monotectic solidification. Patent Document 6 further discloses that the rolling fatigue life is improved favorably by regulating the contents of S and Te, and controlling the presence of sulfide inclusions formed by monotectic solidification.

Patent Document 1: Japanese Patent Application Laid-Open (JP-A) No. S64-55423
Patent Document 2: Japanese Patent Application Laid-Open (JP-A) No. 2006-329319
Patent Document 3: Japanese Patent Application Laid-Open (JP-A) No. 2015-090207
Patent Document 4: Japanese Patent Application Laid-Open (JP-A) No. 2012-214829
Patent Document 5: Japanese Patent Application Laid-Open (JP-A) No. 2014-19911
Patent Document 6: Japanese Patent Application Laid-Open (JP-A) No. 2012-36434

SUMMARY OF INVENTION

Technical Problem

However, in the bearing steel part of Patent Document 1, since an increase in retained austenite lowers the surface hardness, a rolling fatigue life other than the indentation resistant life (that is, the resistance to interior fatigue fracture starting from an inclusion in a clean environment, or the resistance to fracture due to seizure) deteriorates. Further, the surface hardness cannot be maintained at or above the general bearing steel part level (Vickers hardness of 750 or more) generally used for automobiles.

Moreover, in order to further improve the indentation resistant life, it is necessary to impart a sufficient compressive residual stress, instead of decreasing the compressive residual stress as in the bearing steel part of Patent Document 2.

The techniques relating to a bearing steel part disclosed in Patent Documents 3 to 6, are techniques for reducing interior fatigue fracture starting from a non-metallic inclusion (that is, for improving a rolling fatigue life other than the indentation resistant life), and no consideration has been paid to the indentation resistant life. Therefore, in the techniques relating to a bearing steel part disclosed in Patent Documents 3 to 6, there is a room for improving the indentation resistant life.

Therefore, an object of the present disclosure is to provide a bearing steel part that has an excellent indentation resistant life, and that retains a surface hardness at a level equivalent to that of a general bearing steel part, and also provide a steel bar for a bearing steel part that is suitable for obtaining the above bearing steel part.

Solution to Problem

The object is achieved by means including the following means.
<1> A bearing steel part including, in terms of % by mass:
C: 0.76 to 1.20%,
Si: 0.70 to 3.00%,
Mn: 0.10 to 2.00%,
Cr: 0.10 to 3.00%,
Mo: 0.001 to 0.100%,
S: 0.001 to 0.030%,
N: 0.004 to 0.020%,
Ca: 0.0002 to 0.0100%,
Al: 0.001 to 0.010%, O: 0 to 0.005%,
P: 0 to 0.030%,
Ni: 0 to 3.00%,
Cu: 0 to 1.00%,
Co: 0 to 3.00%,
W: 0 to 1.00%,
V: 0 to 0.30%,
Ti: 0 to 0.300%,
Nb: 0 to 0.300%,
B: 0 to 0.0050%
Pb: 0 to 0.50%,
Bi: 0 to 0.50%,
Mg: 0 to 0.0100%,
Zr: 0 to 0.0500%,
Te: 0 to 0.1000%,
rare earth elements: 0 to 0.0050%,
Sn: 0 to 2.0%,
In: 0 to 0.50%, and
the balance consisting of Fe and impurities,
wherein the number density of oxide particles, which have an equivalent circle diameter of 5 μm or more, and comprise CaO, $Al_2O_3$ and $SiO_2$, such that the content ratio of $Al_2O_3$ with respect to the total mass of CaO, $Al_2O_3$, and $SiO_2$ is 50% by mass or more, is $3.0/cm^2$ or less in an arbitrary cross-section of the part,
wherein the Vickers hardness at a depth of 50 μm from a rolling surface is 750 or more, and
wherein the compressive residual stress at the rolling surface is 900 MPa or more.

<2> The bearing steel part according to <1>, including, in terms of % by mass, one or two or more elements selected from:
Ni: 0.01 to 3.00%,
Cu: 0.01 to 1.00%,
Co: 0.01 to 3.00%,
W: 0.01 to 1.00%,
V: 0.01 to 0.30%,
Ti: 0.001 to 0.300%,
Nb: 0.001 to 0.300%, and
B: 0.0001 to 0.0050%.

<3> The bearing steel part according to <1> or <2>, including, in terms of % by mass, one or two or more elements selected from:
Pb: 0.01 to 0.50%,
Bi: 0.01 to 0.50%,
Mg: 0.0001 to 0.0100%,
Zr: 0.0001 to 0.0500%,
Te: 0.0001 to 0.1000%, and rare earth elements: 0.0001 to 0.0050%.

<4> A steel bar for a bearing steel part, including, in terms of % by mass:
C: 0.76 to 1.20%,
Si: 0.70 to 3.00%,
Mn: 0.10 to 2.00%,
Cr: 0.10 to 3.00%,
Mo: 0.001 to 0.100%,
S: 0.001 to 0.030%,
N: 0.004 to 0.020%,
Ca: 0.0002 to 0.0100%,
Al: 0.001 to 0.010%,
O: 0 to 0.005%,
P: 0 to 0.030%,
Ni: 0 to 3.00%,
Cu: 0 to 1.00%,
Co: 0 to 3.00%,
W: 0 to 1.00%,
V: 0 to 0.30%,
Ti: 0 to 0.300%,
Nb: 0 to 0.300%,
B: 0 to 0.0050%
Pb: 0 to 0.50%,
Bi: 0 to 0.50%,
Mg: 0 to 0.0100%,
Zr: 0 to 0.0500%,
Te: 0 to 0.1000%,
rare earth elements: 0 to 0.0050%,
Sn: 0 to 2.0%,
In: 0 to 0.50%, and
the balance consisting of Fe and impurities,
wherein the number density of oxide particles, which have an equivalent circle diameter of 5 μm or more, and comprise CaO, $Al_2O_3$ and $SiO_2$, such that the content ratio of $Al_2O_3$ with respect to the total mass of CaO, $Al_2O_3$, and $SiO_2$ is 50% by mass or more, is $3.0/cm^2$ or less in an arbitrary cross-section of the steel bar.

<5> The steel bar for a bearing steel part according to <4>, including, in terms of % by mass, one or two or more elements selected from:
Ni: 0.01 to 3.00%,
Cu: 0.01 to 1.00%,
Co: 0.01 to 3.00%,
W: 0.01 to 1.00%,
V: 0.01 to 0.30%,
Ti: 0.001 to 0.300%,
Nb: 0.001 to 0.300%, and
B: 0.0001 to 0.0050%.

<6> The steel bar for a bearing steel part according to <4> or <5>, including, in terms of % by mass, one or two or more elements selected from:
Pb: 0.01 to 0.50%,
Bi: 0.01 to 0.50%,
Mg: 0.0001 to 0.0100%,
Zr: 0.0001 to 0.0500%,
Te: 0.0001 to 0.1000%, and
rare earth elements: 0.0001 to 0.0050%.

Advantageous Effects of Invention

According to the present disclosure, a bearing steel part that has an excellent indentation resistant life, and that retains a surface hardness at a level equivalent to that of a general bearing steel part, as well as a steel bar for a bearing steel part that is suitable for obtaining the bearing steel part can be provided.

DESCRIPTION OF EMBODIMENTS

An exemplary embodiment according to the present disclosure will be described below.

In the present specification, any numerical range expressed using "to" refers to a range that includes the numerical values indicated before and after "to" as the minimum and maximum values.

Any numerical range in which the numerical value indicated before or after "to" is associated with "more than" or "less than" refers to a range that does not include the numerical value as the minimum or maximum value.

With respect to the contents of elements in chemical compositions, "%" means "% by mass".

(Bearing Steel Part)

A bearing steel part according to the present embodiment includes a predetermined chemical composition, and, in the bearing steel part, the number density of oxide particles having an equivalent circle diameter of 5 μm or more, and including CaO, $Al_2O_3$ and $SiO_2$, such that the content ratio of $Al_2O_3$ with respect to the total mass of CaO, $Al_2O_3$, and $SiO_2$ is 50% by mass or more (hereinafter also referred to as "oxide particles having an equivalent circle diameter of 5 μm or more and an $Al_2O_3$ content ratio of 50% by mass or more") is $3.0/cm^2$ or less in an arbitrary cross section of the member, the Vickers hardness at a depth of 50 μm from a rolling surface is 750 or more, and the compressive residual stress at the rolling surface is 900 MPa or more.

Due to the above configuration, the bearing steel part according to the present embodiment has an excellent indentation resistant life while retaining a surface hardness at a level equivalent to that of a general bearing steel part. We have invented the bearing steel part according to the present embodiment, based on the following findings.

First, the present inventors have conducted the following evaluation, with a view to realizing a bearing steel part having an excellent indentation resistant life while retaining a surface hardness at a level equivalent to that of a general bearing steel part. Specifically, bearing steel materials prepared by systematically changing the chemical composition were subjected to a combination of various processing processes, to produce bearing steel parts, and the bearing steel parts were subjected to evaluation of the indentation resistant life. As a result, the following findings (1) and (2) were obtained.

(1) Decrease in the indentation resistant life is caused by splits generated from the surface of bulgings around indentations.

(2) By selecting a steel material that includes only a small number of oxide particles having an equivalent circle diameter of 5 μm or more and an $Al_2O_3$ content ratio of 50% by mass or more, and further imparting a compressive residual stress to the rolling surface of the part by shot peening, splits can be reduced and the indentation resistant life can be improved.

It is conceivable that by reducing the number of oxide particles having an equivalent circle diameter of 5 μm or more, and an $Al_2O_3$ content ratio of 50% by mass or more, the properties (for example, adhesion to the base metal) of micro inclusions present in the steel are changed. It is conceivable that the reduction in occurrence of micro cracks generated at the time of shot peening, and occurrence of splits at bulgings is achieved as a consequence of the change in the properties.

In contrast to reduction of generation of micro cracks in Patent Document 2, which is achieved by making milder the shot peening, i.e., by reducing the compressive residual stress, a bearing steel part in which micro cracks do not occur is achieved by performing ordinary shot peening, rather than mild shot peening, to impart a sufficient compressive residual stress.

Further, the present mechanism is a mechanism in which the improvement in indentation resistant life is achieved without using retained austenite, namely a mechanism that utilizes an effect produced by the compressive residual stress and an effect produced by reducing micro cracks. Since retained austenite does not need to be present in a large amount, the present mechanism has an advantage in that the surface hardness does not decrease.

Based on the above findings, we have found that the bearing steel part according to the present embodiment is a bearing steel part having an excellent indentation resistant life while retaining a surface hardness at a level equivalent to that of a general bearing steel part.

Further, since the bearing steel part according to the present embodiment has an excellent indentation resistant life, the bearing steel part can be used in an environment in which foreign matter is present.

A bearing steel part according to the present embodiment will be described in detail below.

(Chemical Composition)

First, the reason for the restriction on the chemical composition of the steel according to the present embodiment will be described.

C: 0.76 to 1.20%

The C content affects the hardness of the bearing steel part. In order to ensure that the required hardness is obtained, the lower limit of the C content is set at 0.76%. On the other hand, when the C content is too high, a large amount of retained austenite occurs after quenching, and the hardness decreases. Therefore, the upper limit of the C content is set at 1.20%. The lower limit of the C content is preferably 0.78%, and more preferably 0.80%. The upper limit of the C content is preferably 1.10%, and more preferably 1.05%.

Si: 0.70 to 3.00%

Si is an element that is effective for deoxidizing a steel, and that affects the composition of oxides. Si is also an element that is effective in imparting a strength under a high temperature environment that a bearing steel part needs to have. When the Si content is less than 0.70%, the effects exerted by Si are insufficient. When the Si content exceeds 3.00%, Si-containing oxides occur and cause cracks at the time of shot peening. For the above reasons, the Si content needs to be within a range of from 0.70 to 3.00%. The lower limit of the Si content is preferably 0.75%, and more preferably 0.80%. Further, the lower limit of the Si content may be more than 0.90% or may be 1.0%. The upper limit of the Si content is preferably 2.50%, and more preferably 2.00%.

Mn: 0.10 to 2.00%

Mn is an element that is effective for imparting the necessary strength and hardenability to a steel. When the Mn content is less than 0.10%, this effect is insufficient. When the Mn content exceeds 2.00%, the amount of retained austenite after quenching is large, and the hardness decreases. For the above reasons, the Mn content needs to be within a range of from 0.10 to 2.00%. The lower limit of the Mn content is preferably 0.20%, and more preferably 0.40%. The upper limit of the Mn content is preferably 1.80%, and more preferably 1.40%.

Cr: 0.10 to 3.00%

Cr is an element that is effective for imparting the necessary strength and hardenability to a steel. When the Cr content is less than 0.10%, this effect is insufficient. When the Cr content exceeds 3.00%, the effect is saturated. For the above reasons, the Cr content needs to be within a range of from 0.10 to 3.00%. The lower limit of the Cr content is preferably 0.15%, and more preferably 0.20%. The upper limit of the Cr content is preferably 2.80%, and more preferably 2.50%.

Mo: 0.001 to 0.100%

Mo is an element that is effective for improving the fatigue strength of a steel, because Mo reduces grain boundary segregation of P, and also imparts the necessary hardenability. When the Mo content is less than 0.001%, this effect is insufficient. When the Mo content exceeds 0.100%, the effect is saturated. For the above reasons, the Mo content needs to be within a range of from 0.001 to 0.100%. The lower limit of the Mo content is preferably 0.010%, and more preferably 0.020%. The upper limit of the Mo content is preferably 0.090%, and more preferably 0.080%.

S: 0.001 to 0.030%

S forms MnS in a steel, which improves the machinability of the steel. In order to acquire machinability at a level at which preparation of a part by cutting is possible, a S content equivalent to that of a steel for ordinary machine structures is required. For the above reasons, the S content needs to be within a range of from 0.001 to 0.030%. The lower limit of the S content is preferably 0.002%, and more preferably 0.003%. The upper limit of the S content is preferably 0.025%, and more preferably 0.020%.

N: 0.004 to 0.020%

Although N is an element that is inevitably included, N has a grain refinement effect via formation of a compound with Al, Ti, V, Cr, or the like. Therefore, N needs to be contained at 0.004% or more. However, when the N content exceeds 0.020%, coarse compound grains are formed, and the grain refinement effect cannot be obtained. For the above reasons, the N content needs to be within a range of from 0.004 to 0.020%. The lower limit of the N content is preferably 0.0045%, and more preferably 0.005%. The upper limit of the N content is preferably 0.015%, and more preferably 0.012%.

Ca: 0.0002 to 0.0100%

Ca is an element that is effective for deoxidizing a steel, and that reduces the content ratio of $Al_2O_3$ in oxides. When the Ca content is less than 0.0002%, this effect is insufficient. When the Ca content exceeds 0.0100%, a large amount of Ca-containing coarse oxide particles occurs, and causes reduction in rolling fatigue life. For the above reasons, the Ca content needs to be within a range of from 0.0002 to 0.0100%. The lower limit of the Ca content is preferably 0.0003%, and more preferably 0.0005%. The upper limit of the Ca content is preferably 0.0080%, and more preferably 0.0060%.

Al: 0.001 to 0.010%

Al crystallizes in a steel as $Al_2O_3$, and affects generation of cracks at the time of shot peening, and generation of splits at bulgings around indentations. Therefore, the Al content needs to be limited to 0.010% or less. The upper limit of the Al content is preferably 0.009%, and more preferably 0.007%. Since a smaller Al content is more preferable, the Al content is preferably 0%. However, since Al is inevitably incorporated as an impurity contained, for example, in an auxiliary raw material used at the time of production, the lower limit of the Al content is 0.001%.

O: 0 to 0.005%

O is an element that affects generation of cracks at the time of shot peening and splits at bulgings, because O forms oxides in a steel. The O content needs to be limited to 0.005% or less. The upper limit of the O content is preferably 0.003% or less, and more preferably 0.002%. Since a smaller O content is more preferable, the lower limit of the O content is 0%. That is, O does not need to be included. Alternatively, the O content may be more than 0%.

P: 0 to 0.030%

P segregates to austenite grain boundaries at the time of heating before quenching, thereby reducing fatigue strength. Therefore, the P content needs to be limited to 0.030% or less. The upper limit of the P content is preferably 0.025% or less, and more preferably 0.023%. Since a smaller P content is more preferable, the lower limit of the P content is 0%. That is, P does not need to be included. Alternatively, the P content may be more than 0%. However, when P is removed more than necessary, the production cost increases. Therefore, a substantial lower limit of the P content is preferably 0.004%.

A bearing steel part according to the present embodiment may further include one or two or more elements selected from the group consisting of Ni, Cu, Co, W, V, Ti, Nb, and B by replacing some of Fe atoms, with a view to enhancing the hardenability or the grain refinement effect. In other words, for each of these elements, the lower limit of the content thereof is 0%. When any of these elements is included, the upper limit of the content of the element is the upper limit of the range described below. The content of each of these elements is preferably from more than 0% to the upper limit of the range described below, and more preferably within the range described below.

Ni: 0.01 to 3.00%

Ni is an element that is effective for imparting the necessary hardenability to a steel. When the Ni content is less than 0.01%, this effect is insufficient in some cases. Therefore, the Ni content is preferably 0.01% or more. When the Ni content exceeds 3.00%, there are cases in which the amount of retained austenite after quenching is large, and in which the hardness decreases. For the above reasons, the upper limit of the Ni content is set at 3.00%. The upper limit of the Ni content is preferably 2.00%, and more preferably 1.80%. The lower limit of the Ni content is preferably 0.10%, and more preferably 0.30%.

Cu: 0.01 to 1.00%

Cu is an element that is effective for improving the hardenability of a steel. When the Cu content is less than 0.01%, this effect is insufficient in some cases. Therefore, the Cu content is preferably 0.01% or more. When the Cu content exceeds 1.00%, hot ductility decreases in some cases. Therefore, the upper limit of the Cu content is set at 1.00%. The upper limit of the Cu content may be 0.50%, 0.30%, or 0.20%. In a case in which Cu is included in order to obtain the above effect, the lower limit of the Cu content is preferably 0.05%, and more preferably 0.10%.

Co: 0.01 to 3.00%

Co is an element that is effective for improving the hardenability of a steel. When the Co content is less than 0.01%, this effect is insufficient in some cases. Therefore, the Co content is preferably 0.01% or more. When the Co content exceeds 3.00%, the effect is saturated in some cases. Therefore, the upper limit of the Co content is set at 3.00%. The upper limit of the Co content may be 0.30%, 0.20%, or 0.10%. In a case in which Co is included in order to obtain the above effect, the lower limit of the Co content is preferably 0.05%, and more preferably 0.10%.

W: 0.01 to 1.00%

W is an element that is effective for improving the hardenability of a steel. When the W content is less than 0.01%, this effect is insufficient in some cases. Therefore, the W content is preferably 0.01% or more. When the W content exceeds 1.00%, the effect is saturated in some cases. Therefore, the upper limit of the W content is set at 1.00%. The upper limit of the W content may be 0.30%, 0.20%, or 0.10%. In a case in which W is included in order to obtain the above effect, the lower limit of the W content is preferably 0.05%, and more preferably 0.10%.

V: 0.01 to 0.30%

V is an element that forms compounds with C and N, thereby exerting a grain refinement effect. When the V content is less than 0.01%, this effect is insufficient in some cases. Therefore, the V content is preferably 0.01% or more.

When the V content exceeds 0.30%, there are cases in which the compound grain is coarse, and in which the grain refinement effect is not obtained. Therefore, the upper limit of the V content is set at 0.30%. The upper limit of the V content may alternatively be 0.20%, or 0.10%. In a case in which V is included in order to obtain the above effect, the lower limit of the V content is preferably 0.10%, and more preferably 0.15%.

Ti: 0.001 to 0.300%

Ti is an element that produces micro Ti-based precipitates, such as TiC, (Ti, Nb)C, and TiCS, in a steel, thereby exerting a grain refinement effect. When the Ti content is less than 0.001%, the effect is insufficient in some cases. Therefore, the Ti content is preferably 0.001% or more. When the Ti content exceeds 0.300%, the effect is saturated in some cases. For the above reasons, the content of Ti is set at 0.300% or less. The upper limit of the Ti content is preferably 0.250%, and more preferably 0.200%.

Nb: 0.001 to 0.300%

Nb is an element that produces (Ti, Nb)C in a steel, thereby exerting a grain refinement effect. When the Nb content is less than 0.001%, this effect is insufficient in some cases. Therefore, the Nb content is preferably 0.001% or more. When the Nb content exceeds 0.300%, the effect is saturated in some cases. For the above reasons, the content of Nb is set at 0.300% or less. The upper limit of the Nb content is preferably 0.250%, and more preferably 0.200%.

B: 0.0001 to 0.0050%

B has a function of reducing segregation of P to grain boundaries. B also has an effect in terms of improving the grain boundary strength and intragranular strength, and an effect in terms of improving hardenability. These effects improve the fatigue strength of the steel. When the B content is less than 0.0001%, these effects are insufficient in some cases. Therefore, the B content is preferably 0.0001% or more. When the B content exceeds 0.0050%, the effects are saturated in some cases. For the above reasons, the content of B is set at 0.0050% or less. The upper limit of the B content is preferably 0.0045%, and more preferably 0.0040%.

The chemical composition of the bearing steel part according to the present embodiment may further include one or two or more elements selected from the group consisting of Pb, Bi, Mg, Zr, Te, and a rare earth element (REM) by replacing some of Fe atoms. In other words, for each of these elements, the lower limit of the content thereof is 0%. When any of these elements is included, the upper limit of the content of the element is the upper limit of the range described below. The content of each of these elements is preferably from more than 0% to the upper limit of the range described below, and more preferably within the range described later.

Pb: 0.01 to 0.50%

Pb is an element that improves the machinability by melting or embrittling at the time of cutting. When the Pb content is less than 0.01%, this effect is insufficient in some cases. Therefore, the Pb content is preferably 0.01% or more. When Pb is added in an excessively large amount, the manufacturability is deteriorated in some cases. Therefore, the upper limit of the Pb content is set at 0.50%. The upper limit of the Pb content may be 0.30%, 0.20%, or 0.10%. In a case in which Pb is included in order to obtain the above effect, the lower limit of the Pb content is preferably 0.02%, and more preferably 0.05%.

Bi: From 0.01 to 0.50%

Bi is an element that improves the machinability by providing finely dispersed sulfide particles thereof. When the Bi content is less than 0.01%, this effect is insufficient in some cases. Therefore, the Bi content is preferably 0.01% or more. Meanwhile, when Bi is added in an excessively large amount, there are cases in which the hot workability of the steel is deteriorated, and in which the steel is difficult to hot-roll. Therefore, the upper limit of the Bi content is set at 0.50%. The upper limit of the Bi content may be 0.20%, 0.10%, or 0.05%. In a case in which Bi is included in order to obtain the above effect, the lower limit is preferably 0.02%, and more preferably 0.05%.

Mg: 0.0001 to 0.0100%

Mg is a deoxidizing element, and forms an oxide in a steel. Furthermore, a Mg-based oxide formed with Mg is apt to serve as a nucleus for crystallization and/or precipitation of MnS. Further, a Mg sulfide, when taking the form of a composite sulfide of Mn and Mg, spheroidizes a MnS particle. As described above, Mg is an element effective for regulating the dispersion of MnS particles and improving the machinability. When the Mg content is less than 0.0001%, this effect is insufficient in some cases. Therefore, the Mg content is preferably 0.0001% or more. However, when the Mg content exceeds 0.0100%, there are cases in which a large amount of MgS is formed, and in which the machinability of the steel is deteriorated. Therefore, in a case in which Mg is included in order to obtain the above effect, the upper limit of the Mg content is set at 0.0100%. The upper limit of the Mg content is preferably 0.0080%, and more preferably 0.0060%. The lower limit of the Mg content is preferably 0.0005%, and more preferably 0.0010%.

Zr: 0.0001 to 0.0500%

Zr is a deoxidizing element, and forms an oxide. Furthermore, the Zr-based oxide formed with Zr is apt to serve as a nucleus for crystallization and/or precipitation of MnS. As described above, Zr is an element that is effective for regulating the dispersion of MnS particles and improving the machinability. When the Zr content is less than 0.0001%, this effect is insufficient in some cases. Therefore, the Zr content is preferably 0.0001% or more. However, when the Zr content exceeds 0.0500%, the effect is saturated in some cases. Therefore, in a case in which Zr is included in order to obtain the above effect, the upper limit of the Zr content is set at 0.0500%. The upper limit of the Zr content is preferably 0.0400%, and more preferably 0.0100%. The lower limit of the Zr content is preferably 0.0005%, and more preferably 0.0010%.

Te: 0.0001 to 0.1000%

Te improves the machinability of a steel because Te accelerates spheroidization of MnS. When the Te content is less than 0.01%, this effect is insufficient in some cases. Therefore, the Te content is preferably 0.01% or more. When the Te content exceeds 0.1000%, the effect is saturated in some cases. Therefore, in a case in which Te is included in order to obtain the above effect, the upper limit of the Te content is set at 0.1000%. The upper limit of the Te content is preferably 0.0800%, and more preferably 0.0600%. The upper limit of the Te content may be 0.0100%, 0.0070%, or 0.0050%. The lower limit of the Te content is preferably 0.0005%, and more preferably 0.0010%.

Rare Earth Elements: 0.0001 to 0.0050%

Rare earth elements form a sulfide in a steel, and accelerates formation of MnS due to the sulfide serving as a precipitation nucleus for MnS. Rare earth elements improve the machinability of the steel. When the total content of rare earth elements is less than 0.0001%, this effect is insufficient in some cases. Therefore, the total content of rare earth elements is preferably 0.0001% or more. However, when the total content of rare earth elements exceeds 0.0050%, there are cases in which sulfide particles thereof are coarse and deteriorate the fatigue strength of the steel. Therefore, in a case in which rare earth elements are included in order to obtain the above effect, the upper limit of the total content of rare earth elements is set at 0.0050%. The upper limit of the total content of rare earth elements is preferably 0.0040%, and more preferably 0.0030%. The lower limit of the total content of rare earth elements is preferably 0.0005%, and more preferably 0.0010%.

As used herein, the term "rare earth elements" collectively means 17 elements including 15 elements from lanthanum (La) having an atomic number of 57 to lutetium (Lu) having an atomic number of 71 in the periodic table, as well as yttrium (Y) and scandium (Sc). The content of rare earth elements means the total content of the one or two or more of these elements that are present.

The chemical composition of the bearing steel part according to the present embodiment may further include one or two elements selected from the group consisting of Sn and In by replacing some of Fe atoms. In other words, for each of these elements, the lower limit of the content thereof is 0%. When any of these elements is included, the upper limit of the content of the element is the upper limit of the range described below. The content of each of these elements is preferably from more than 0% to the upper limit of the range described below, and more preferably within the range described below.

Sn: 0.01% to 2.0%

Sn has an effect in terms of embrittling ferrite to extend tool life, and reducing the surface roughness after machining. For stably obtaining these effects, the Sn content is preferably 0.01% or more. Meanwhile, even when Sn is included in excess of 2.0%, the effect is saturated. Therefore, when Sn is included, the Sn content is set at 2.0% or less.

In: 0.01% to 0.50%

In is an element that improves the machinability by melting or embrittling at the time of cutting. When the In content is less than 0.01%, the effect is insufficient in some cases. Therefore, the In content is preferably 0.01% or more. Meanwhile, when it is added in an excessively large amount, the manufacturability is deteriorated in some cases. Therefore, the upper limit of the In content is set at 0.50%. The upper limit of the In content may be 0.30%, 0.20%, or 0.10%. In a case in which In is included to obtain the above effect, the lower limit of the In content is more preferably 0.02%, and further preferably 0.05%.

The bearing steel part according to the present embodiment includes the above alloy ingredients, and the balance includes Fe and impurities. Elements (elements such as Sb, Ta, As, H, Hf, and Zn), other than the above-mentioned alloy ingredients, as impurities originating from raw materials and production equipment may be incorporated into a steel, as far as the amounts of the elements incorporated are at a level at which the characteristics of the steel are not affected.

(Metal Structure)

Next, the metal structure of the bearing steel part according to the present embodiment will be described.

The number density of oxide particles having an equivalent circle diameter of 5 µm or more and an $Al_2O_3$ content ratio of 50% by mass or more will be described.

The present inventors have investigated the relationship between oxides and indentation resistant lives, using steels that differ from one another in kind and amount of oxide, with a view to reducing cracking at the time of shot peening and occurrence and propagation of splits from bulgings around indentations.

First, the influence of the kind and amount of the oxide species constituting the oxide has been examined. As a result, we have found that, among various oxide species present in a steel, the proportions of $Al_2O_3$, CaO, and $SiO_2$ have an influence on the indentation resistant life, and the content ratio of $Al_2O_3$ with respect to the total mass of the three oxides strongly correlates with the indentation resistant life. In other words, we have found that even when the oxides present include oxides other than $Al_2O_3$, CaO, and $SiO_2$, the content ratio of $Al_2O_3$ with respect to the total mass of $Al_2O_3$, CaO, and $SiO_2$ strongly correlates with the indentation resistant life.

Next, the shape and the number of oxide particles that affect the indentation resistant life have been examined. As a result, it has been found that the number density of oxide particles having an equivalent circle diameter of 5 µm or more is correlated with the indentation resistant life. Then, the content ratio of $Al_2O_3$ and the number density of oxide particles having an equivalent circle diameter of equivalent circle diameter of 5 µm or more, which have a strong effect on the indentation resistant life, are plotted respectively on the vertical axis and the horizontal axis for organization. As a result, we have found that excellent indentation resistant life is obtained in a region in which the number density of oxide particles having an equivalent circle diameter of 5 µm or more and a content ratio of $Al_2O_3$ of 50% by mass or more is $3.0/cm^2$ or less, and that the indentation resistant life decreases as the deviation from the region becomes greater.

We presume that the above effect is produced because "occurrence of splits at bulgings" and "micro cracks generated at the time of shot peening" due to micro inclusions, of which size is too small to be detected with a light microscope, can be made harmless by controlling oxide particles having an equivalent circle diameter of 5 µm or more, and an $Al_2O_3$ content ratio of 50% by mass or more.

Cracks were not observed in bearing steel parts in which the number density of oxide particles having an equivalent circle diameter of 5 µm or more and an $Al_2O_3$ content ratio of 50% by mass or more was $3.0/cm^2$ or less, and an excellent indentation resistant life was obtained. Therefore, the upper limit of the number density of the oxide particles is set at $3.0/cm^2$. The upper limit of the number density of the oxide particles having an $Al_2O_3$ content ratio of 50% by mass or more is preferably $2.0/cm^2$, and more preferably $1.5/cm^2$. Since oxide particles are preferably absent, the lower limit is $0/cm^2$.

The number density of the oxide particles is a value as measured by the method described in "Examples", except for selection of an observation field. The observation field is not limited as far as an area of $4 cm^2$ is secured as the total area of observed regions in a cross-sectional face.

Next, the Vickers hardness at a depth of 50 µm from the rolling surface will be described.

When the surface hardness is lowered, a bulging around an indentation becomes flattened, and, therefore, the indentation resistant life can be increased; however, the rolling fatigue life other than the indentation resistant life decreases. Therefore, in order to maintain a rolling fatigue life other than the indentation resistant life, a hardness that is at a level of bearing steel parts generally used for automobiles, namely a Vickers hardness of about 750, is required. For this reason, the surface hardness, that is, the Vickers hardness at a depth of 50 µm from the rolling surface, needs to be 750 or more. However, since an excessively high Vickers hardness induces brittleness, the upper limit of the Vickers hardness needs to be set at 1050. The upper limit of the Vickers hardness is preferably 1000, and more preferably 950.

The Vickers hardness is a value as measured by the method described in "Examples", except for the cutting position. Although the cutting position varies depending on the part shape, the measurement may be carried out on a cross-section cut perpendicular to the rolling surface.

Next, the compressive residual stress of a rolling surface will be described.

The compressive residual stress of the rolling surface has an effect of reducing occurrence of splits from bulgings around indentations and thereby improving the indentation resistant life. In order to obtain this effect, the compressive residual stress of the rolling surface needs to be 900 MPa or more. Although a higher compressive residual stress of the rolling surface is more preferable, obtainment of an excessively high compressive residual stress necessitates intense working such as shot peening with a high air pressure, which causes deformation of the part and makes the part unable to function. Therefore, the upper limit of the compressive residual stress of the rolling surface is 2000 MPa.

The compressive residual stress is a value as measured by the method described in "Examples"

Next, the metal structure of the bearing steel part will be described.

The bearing steel part according to the present embodiment can be obtained by quenching at austenite/cementite phase and tempering.

Therefore, examples of the metal structure of the bearing steel part include a metal structure mainly including tempered martensite and cementite (for example, at an area proportion of 60% or more), as well as retained austenite and the balance (including bainite and inclusions). In this regard, the area proportion of retained austenite is preferably 10% or less, more preferably from 2 to 8%, and still more preferably from 3 to 7%, from the viewpoint of obtaining a Vickers hardness of 750 or more.

However, depending on the relationship between the cooling rate at the time of quenching and the shape of the part, there are cases in which quenching inside the part is insufficient, and in which the metal structure of the bearing steel part includes a decreased proportion of tempered martensite and an increased proportion of bainite.

The area proportion of retained austenite is measured using an XRD (X-ray diffractometer). Specifically, with respect to the area proportion of retained austenite, the volume proportion of retained austenite is calculated from the peak area at or around 156.40 degrees attributable to martensite and the peak area at or around 128.40 degrees attributable to retained austenite, and this volume proportion is defined as the area proportion of retained austenite.

The metal structure of the bearing steel part refers to a metal structure at, or inner side than, a depth of 2.00 mm from the surface of the bearing steel part.

(Steel Bar for Bearing Steel Part)

A steel bar for a bearing steel part according to the present embodiment, which is suitable for obtaining the bearing steel part according to the present embodiment, is as follows.

The steel bar for a bearing steel part according to the present embodiment has the same chemical composition as that of the bearing steel part according to the present embodiment, and, in the steel bar, the number density of oxide particles that have an equivalent circle diameter of 5 μm or more, and include CaO, $Al_2O_3$ and $SiO_2$, such that the content ratio of the $Al_2O_3$ with respect to the total mass of the CaO, the $Al_2O_3$, and the $SiO_2$ is 50% by mass or more, is $3.0/cm^2$ or less in an arbitrary cross section of the steel bar.

Here, the method of measuring the number density of oxide particles is the same as the method of measuring the number density of oxide particles in the bearing steel part according to the present embodiment.

Examples of the metal structure of the steel bar for a bearing steel part according to the present embodiment include a metal structure mainly including pearlite and bainite (for example, at an area proportion of 60% or more), as well as pro-eutectoid cementite, ferrite, and the balance.

The metal structure of the steel bar for a bearing steel part is a metal structure at, or inner side than, a depth of 2.00 mm from the surface of the steel bar for a bearing steel part.

(Method of Producing Bearing Steel Part)

Next, a method of producing the bearing steel part according to the present embodiment will be described.

For example, the bearing steel part, having the above metal structure, may favorably be produced as follows.

First, primary refining is performed in a converter using a raw material, such as iron ore or a scrap-based raw material. Si is added to molten steel tapped from the converter, and then Al is added to perform a deoxidizing treatment. After the deoxidizing treatment, the components of the molten steel are adjusted to have the aforementioned chemical composition by secondary refining using a ladle refining method or a refining method using a vacuum processing equipment. The molten steel, of which the components have been adjusted, is preferably subjected to continuous casting to form a steel ingot. By controlling the refining method, the number density of the aforementioned oxide particles can be controlled. When only Al deoxidation is performed, for example, even if Si is included as a chemical component, or even if $SiO_2$ is included in a flux to be added, no $SiO_2$ component is included in oxide particles as inclusions. This is because reduction occurs on Si or $SiO_2$.

In the above, at the time of casting, the molten steel temperature in the tundish is a 5 to 200° C. superheated temperature, and electromagnetic stirring is performed in the mold.

Next, the steel ingot is subjected to blooming or slabbing, processed to have a predetermined cross-sectional shape by hot rolling, and then cooled to obtain a steel bar for a bearing steel part. The cooling rate after the hot rolling is preferably regulated in a range of from 0.1 to 5° C./sec in terms of the average cooling rate of the surface temperature of the steel material in a 800° C. to 300° C. region.

Next, the obtained steel bar for a bearing steel part is subjected to hot forging, cold forging, machining, or the like into a part shape including a margin corresponding to polishing loss, and then quenching and tempering are performed. During this process, a heat treatment such as normalizing or spheroidizing annealing may be performed for increasing the efficiency of forging or machining. Further, the quenching and tempering are preferably performed under reduced pressure or in a non-oxidizing atmosphere. Machining may be performed after the quenching and tempering.

Then, shot peening is performed on the processed product. Thereafter, polishing is performed to secure dimensional accuracy. In a case in which a predetermined dimensional accuracy can be obtained after the shot peening, the polishing may be omitted. By producing a bearing steel part in this manner, the aforementioned metal structure can be obtained.

EXAMPLES

Next, examples according to the present disclosure will be described. It should be understood that the condition used in the examples is one exemplary condition adopted for confirming the practicability and effect according to the present disclosure, and that the present disclosure is not limited to the one exemplary condition. The present disclosure allows for adopting of various conditions as far as the object of the present disclosure is achieved without departing from the spirit of the present disclosure.

Various steel ingots including the chemical components shown in Table 1 were hot-rolled to obtain steel bars.

Then, each steel bar was subjected to hot forging to a diameter of 28 mm to obtain a forged product. Steel number 25 is a general-purpose bearing steel SUJ2 defined in the JIS Standards. The heating temperature before forging was 1250° C. Then, a normalizing treatment was applied to the forged product under the conditions in which the forged product was maintained at a normalizing temperature indicated in Table 1 (between 900 and 1050° C.) for 1 hour for complete austenitization, and then allowed to cool down.

Next, a spheroidizing annealing treatment was performed on the normalized product under the conditions in which the normalized steel was maintained at 795° C. for 1.5 hours, and then cooled to 650° C. at a rate of 12° C./hour, and then allowed to cool down further.

Next, the annealed product was shaped into a solid cylinder of φ12.2 mm×150 mm. Then, the cylindrical product was maintained at 830° C. in an argon atmosphere for 0.5 hours, subjected to quenching under the condition of being subjected to oil cooling of 60° C., and then tempered by being maintained at 180° C. for 2 hours.

Then, the resultant tempered cylindrical products of Steel numbers 1 to 24, 26 to 33, and 35 to 36 were subjected to shot peening in the manner indicated in Table 2.

In this regard, the shot peening A was performed on No. 1 to 24, and 26 to 33, shot peening B was performed on No. 35, and shot peening C was performed on No. 36. No. 25 and 34 were not subjected to shot peening.

Thus, samples of bearing steel parts were obtained.

<Shot Peening A>
Shot particle: round cut steel wire φ1.0, HV800
Air pressure: 0.5 MPa
Coverage: 400%

<Shot Peening B>
Shot particle: round cut steel wire φ1.0, HV800
Air pressure: 0.3 MPa
Coverage: 200%

<Shot Peening C>
Shot particle: round cut steel wire φ1.0, HV600
Air pressure: 0.2 MPa
Coverage: 200%

Figure 1:
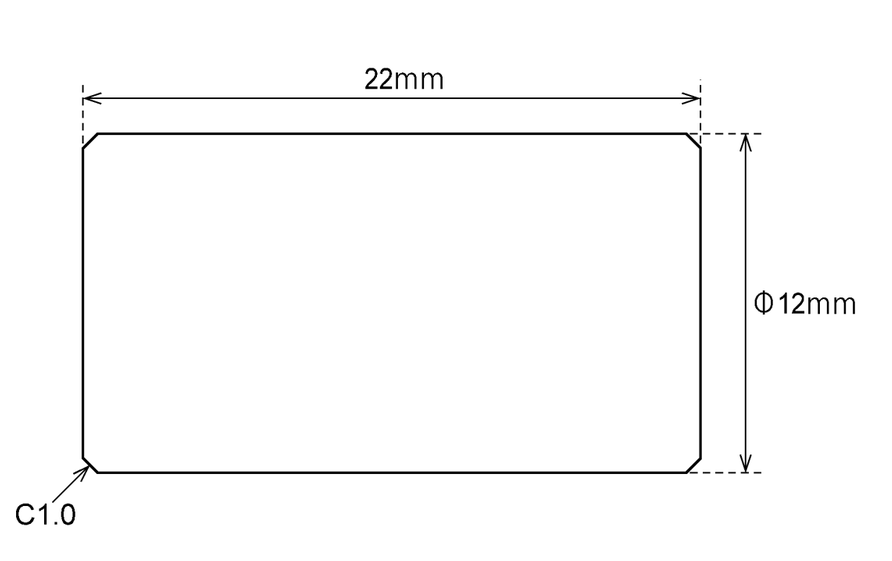
FIG. 1 is a schematic surface view illustrating a solid-cylindrical test piece for rolling fatigue, the test piece having external dimensions of ϕ12 mm×22 mm.

Thereafter, each bearing steel part sample is processed by polishing and finished with buffing to prepare a solid-cylindrical test piece for rolling fatigue having external dimensions of φ12 mm×22 mm as shown in FIG. 1. Then, the indentation resistant life was evaluated. The evaluation of the indentation resistant life was performed using an NTN cylinder-to-cylinder rolling fatigue tester. Particulars are as follows.

First, the test piece was held in the tester under a load of 530 kgf/mm$^2$ at 46240 rpm for 10 sec including the acceleration time for determining positions to be indented in the test piece. Four indentations were formed at the determined positions at 90° intervals, using a Rockwell hardness tester. Thereafter, the exfoliation life was measured by detecting exfoliation using a vibrometer while rotating the test piece at 46240 rpm under a load of 600 kgf/mm$^2$ using FBK turbine oil (ISO viscosity grade 56) produced by JX Nippon Oil & Energy Corporation as a lubricant oil to a maximum of $10^7$ cycles. The exfoliation life values obtained for N=10 were plotted on a Weibull chart, and the life until 10% breakage was taken as the indentation resistant life. In addition, as a rolling fatigue life other than the indentation resistant life, the exfoliation life was measured, in a state without indentation, to a maximum of $10^8$ cycles for N=2, and the average value thereof was taken as the rolling fatigue life.

The Vickers hardness at a depth of 50 μm from the rolling surface was measured as follows. A cross-section was obtained by cutting the solid-cylindrical test piece for rolling fatigue perpendicularly to the longitudinal direction at a position approximately 7 mm from an end face, and this cross-section corresponds to the test positions of the test piece. The hardness was measured on the cross-section, using a Micro Vickers hardness tester according to JIS Z 2244:2009. Specifically, the hardness at a depth of 50 μm from the rolling surface was measured under the conditions of a load of 200 g and holding time of 10 sec at five positions that were apart from one another by 150 μm in terms of a distance between dent centers, and the arithmetic mean value of the measured hardness values was regarded as the Vickers hardness.

The compressive residual stress of the rolling surface was measured as follows. Each solid-cylindrical test piece for rolling fatigue was masked such that a 2 mm×2 mm region centered on a position approximately 7 mm from the end face could be measured. Then, the compressive residual stress of the rolling surface was measured in the 2 mm×2 mm area, using an AutoMATE manufactured by Rigaku Denki (using Cr tube) with a φ1 mm collimator according to the $2\theta \cdot \sin^2\psi$ method and the iso-inclination method.

The number density of oxide particles having an equivalent circle diameter of 5 μm or more, and an $Al_2O_3$ content ratio of 50% by mass or more was measured as follows. Each solid-cylindrical test piece for rolling fatigue was cut perpendicularly to the longitudinal direction at the positions of 3, 7, 15, and 19 mm from the end face. The cut sections of each test piece were mirror-polished using a diamond paste. Thereafter, a square area of 1 cm×1 cm in each cut face of the test piece was set such that the center of the square coincided with the center of the circle, and the square area was observed under an optical microscope and the positions of inclusions having an equivalent circle diameter of 5 μm or more were recorded. Then, the identification of oxides, sulfides, carbides, nitrides, and carbonitrides was performed by analyzing a spectrum obtained by analysis on the entire region of each inclusion using an energy dispersive X-ray analyzer (EDS) mounted on a scanning electron microscope (JSM-6500F manufactured by JEOL Ltd.). In the analysis, the acceleration voltage was set at 20 keV, and measurement for each region was performed for 10 sec. For analysis and quantification of the spectrum, Analysis Station, a software created by JEOL Ltd., was used.

With respect to inclusions that had been judged as oxides, the mass ratio between three elements of Ca, Al, and Si, other than oxygen, was determined, and converted to the mass ratio between oxides formed from the three elements (that is, CaO, $Al_2O_3$, and $SiO_2$), thereby calculating the content ratio of $Al_2O_3$ with respect to the total mass of CaO, $Al_2O_3$, and $SiO_2$. Then, the number density was calculated by dividing the number of oxide particles having an $Al_2O_3$ content ratio of 50% by mass or more by the observation area of 4 cm$^2$ (, which is the total observation area as a product of 1 cm×1 cm (each observation area) times 4 (observation fields)).

The "number density of oxide particles having an equivalent circle diameter of 5 µm or more, and an $Al_2O_3$ content ratio of 50% by mass or more" of the obtained steel bar before forging was measured in the same manner.

Table 2 shows the number density of oxide particles having an equivalent circle diameter of 5 µm or more, and an $Al_2O_3$ content ratio of 50% by mass or more (denoted as "number density of oxide particles" in the tables), the Vickers hardness at a depth of 50 µm from the rolling surface (denoted as "surface hardness" in the tables), the compressive residual stress of the rolling surface; the indentation resistant life, and the rolling fatigue life in the respective sample steel species.

Table 2 shows the area ratio of retained austenite (denoted as "retained γ amount" in the tables) in the respective sample steel species, as measured according to the foregoing method.

In the tables, the expression, "10^X" means "$10^X$". For example, "10^6" means "$10^6$".

The underlining for values in Tables 1 and 2 indicate that the values are outside the scope of the present disclosure. Blank spaces in the chemical composition shown in Table 1 indicate that elements corresponding to the blank spaces were not intentionally added.

TABLE 1

| Steel number | Class | Chemical composition (% by mass): Balance = Fe + impurities | | | | | |
|---|---|---|---|---|---|---|---|
| | | C | Si | Mn | Cr | Mo | S |
| 1 | Inventive Example | 1.01 | 0.92 | 0.51 | 0.35 | 0.001 | 0.004 |
| 2 | Inventive Example | 0.92 | 1.53 | 0.82 | 1.22 | 0.050 | 0.005 |
| 3 | Inventive Example | 1.11 | 0.70 | 0.35 | 0.85 | 0.032 | 0.029 |
| 4 | Inventive Example | 1.05 | 1.02 | 1.52 | 1.76 | 0.098 | 0.009 |
| 5 | Inventive Example | 1.18 | 0.85 | 1.03 | 0.55 | 0.015 | 0.015 |
| 6 | Inventive Example | 0.76 | 2.95 | 0.11 | 2.91 | 0.085 | 0.001 |
| 7 | Inventive Example | 0.85 | 1.95 | 0.95 | 0.52 | 0.037 | 0.023 |
| 8 | Inventive Example | 0.95 | 1.31 | 0.75 | 1.15 | 0.082 | 0.019 |
| 9 | Inventive Example | 1.00 | 1.25 | 1.30 | 1.99 | 0.046 | 0.010 |
| 10 | Inventive Example | 0.82 | 1.10 | 0.88 | 0.10 | 0.092 | 0.009 |
| 11 | Inventive Example | 0.93 | 0.98 | 0.55 | 2.33 | 0.021 | 0.023 |
| 12 | Inventive Example | 0.80 | 1.30 | 0.60 | 1.77 | 0.035 | 0.015 |
| 13 | Inventive Example | 0.97 | 1.55 | 1.91 | 0.33 | 0.011 | 0.010 |
| 14 | Inventive Example | 1.00 | 0.81 | 0.42 | 1.01 | 0.033 | 0.007 |
| 15 | Inventive Example | 0.89 | 1.40 | 0.97 | 1.35 | 0.067 | 0.019 |
| 16 | Inventive Example | 1.03 | 1.11 | 0.54 | 0.65 | 0.051 | 0.014 |
| 17 | Inventive Example | 0.95 | 1.04 | 0.56 | 1.25 | 0.038 | 0.005 |
| 18 | Inventive Example | 1.02 | 1.85 | 0.92 | 1.11 | 0.081 | 0.003 |
| 19 | Inventive Example | 0.95 | 1.60 | 1.01 | 1.54 | 0.050 | 0.007 |
| 20 | Inventive Example | 0.98 | 0.75 | 0.77 | 0.91 | 0.063 | 0.003 |
| 21 | Inventive Example | 1.01 | 1.22 | 0.65 | 1.33 | 0.019 | 0.005 |
| 22 | Inventive Example | 1.03 | 1.36 | 0.85 | 1.22 | 0.013 | 0.006 |
| 23 | Inventive Example | 0.98 | 1.10 | 0.71 | 1.50 | 0.020 | 0.003 |
| 24 | Inventive Example | 1.05 | 0.85 | 0.33 | 1.09 | 0.011 | 0.005 |
| 25 | Comparative Example | 1.00 | <u>0.25</u> | 0.41 | 1.43 | | 0.007 |
| 26 | Comparative Example | 1.15 | 0.95 | 0.35 | 2.85 | 0.033 | 0.022 |
| 27 | Comparative Example | 0.77 | <u>0.67</u> | 1.95 | 0.11 | 0.011 | 0.013 |
| 28 | Comparative Example | <u>1.21</u> | 0.95 | 0.63 | 1.32 | 0.029 | 0.006 |
| 29 | Comparative Example | <u>0.75</u> | 1.13 | 0.54 | 1.03 | 0.014 | 0.021 |
| 30 | Comparative Example | 1.03 | <u>3.05</u> | 0.85 | 0.95 | 0.015 | 0.011 |
| 31 | Comparative Example | 0.95 | 1.03 | <u>2.03</u> | 1.29 | 0.021 | 0.009 |
| 32 | Comparative Example | 0.99 | 1.22 | <u>0.05</u> | 0.76 | 0.039 | 0.014 |
| 33 | Comparative Example | 0.92 | 1.02 | 1.81 | 2.65 | 0.020 | 0.027 |

| Steel number | Chemical composition (% by mass): Balance = Fe + impurities | | | | | | | Normalizing temperature (° C.) |
|---|---|---|---|---|---|---|---|---|
| | N | Ca | Al | O | P | Ni | Cu | |
| 1 | 0.012 | 0.0015 | 0.008 | 0.001 | 0.015 | | | 950 |
| 2 | 0.008 | 0.0020 | 0.005 | 0.001 | 0.011 | | | 950 |
| 3 | 0.004 | 0.0043 | 0.006 | 0.002 | 0.010 | | | 1000 |
| 4 | 0.007 | 0.0012 | 0.003 | 0.001 | 0.012 | | | 1000 |
| 5 | 0.019 | 0.0065 | 0.009 | 0.001 | 0.008 | | | 1050 |
| 6 | 0.008 | 0.0002 | 0.010 | 0.001 | 0.013 | | | 1000 |
| 7 | 0.006 | 0.0015 | 0.007 | 0.002 | 0.015 | 1.52 | | 950 |
| 8 | 0.007 | 0.0025 | 0.006 | 0.001 | 0.018 | | 0.05 | 950 |
| 9 | 0.006 | 0.0009 | 0.007 | 0.001 | 0.013 | | | 1000 |
| 10 | 0.009 | 0.0095 | 0.005 | 0.001 | 0.009 | | | 900 |
| 11 | 0.010 | 0.0021 | 0.006 | 0.001 | 0.012 | | | 950 |
| 12 | 0.009 | 0.0003 | 0.003 | 0.001 | 0.011 | | | 950 |
| 13 | 0.007 | 0.0018 | 0.005 | 0.001 | 0.016 | | | 1000 |
| 14 | 0.008 | 0.0002 | 0.007 | 0.001 | 0.008 | | | 1000 |
| 15 | 0.006 | 0.0017 | 0.006 | 0.001 | 0.009 | | | 950 |
| 16 | 0.012 | 0.0021 | 0.005 | 0.001 | 0.007 | | | 1000 |
| 17 | 0.005 | 0.0012 | 0.003 | 0.001 | 0.015 | | | 950 |
| 18 | 0.008 | 0.0013 | 0.006 | 0.001 | 0.012 | | | 950 |
| 19 | 0.009 | 0.0025 | 0.006 | 0.001 | 0.005 | | | 950 |

TABLE 1-continued

| | | | | | | | | |
|---|---|---|---|---|---|---|---|---|
| 20 | 0.005 | 0.0008 | 0.005 | 0.001 | 0.007 | | | 1000 |
| 21 | 0.008 | 0.0002 | 0.008 | 0.001 | 0.008 | | | 1000 |
| 22 | 0.006 | 0.0009 | 0.005 | 0.001 | 0.009 | | | 1000 |
| 23 | 0.007 | 0.0020 | 0.003 | 0.001 | 0.011 | | | 1000 |
| 24 | 0.008 | 0.0056 | 0.006 | 0.001 | 0.009 | | | 950 |
| 25 | 0.007 | | 0.025 | 0.001 | 0.016 | | | 960 |
| 26 | 0.004 | 0.0009 | 0.015 | 0.001 | 0.019 | | | 1000 |
| 27 | 0.005 | 0.0015 | 0.008 | 0.001 | 0.013 | | | 950 |
| 28 | 0.006 | 0.0031 | 0.005 | 0.001 | 0.012 | | | 1050 |
| 29 | 0.005 | 0.0009 | 0.006 | 0.001 | 0.013 | | | 950 |
| 30 | 0.007 | 0.0013 | 0.006 | 0.001 | 0.019 | | | 950 |
| 31 | 0.005 | 0.0016 | 0.004 | 0.001 | 0.009 | | | 950 |
| 32 | 0.006 | 0.0022 | 0.003 | 0.001 | 0.008 | | | 1000 |
| 33 | 0.018 | 0.0120 | 0.009 | 0.001 | 0.020 | | | 1000 |

| Steel number | Class | Chemical composition (% by mass): Balance = Fe + impurities | | | | | | | |
|---|---|---|---|---|---|---|---|---|---|
| | | C | Co | W | V | Ti | Nb | B | Pb |
| 1 | Inventive Example | 1.01 | | | | | | | |
| 2 | Inventive Example | 0.92 | | | | | | | |
| 3 | Inventive Example | 1.11 | | | | | | | |
| 4 | Inventive Example | 1.05 | | | | | | | |
| 5 | Inventive Example | 1.18 | | | | | | | |
| 6 | Inventive Example | 0.76 | | | | | | | |
| 7 | Inventive Example | 0.85 | | | | | | | |
| 8 | Inventive Example | 0.95 | | | | | | | |
| 9 | Inventive Example | 1.00 | 0.03 | | | | | | |
| 10 | Inventive Example | 0.82 | | 0.05 | | | | | |
| 11 | Inventive Example | 0.93 | | | 0.06 | | | | |
| 12 | Inventive Example | 0.80 | | | | 0.058 | | | |
| 13 | Inventive Example | 0.97 | | | | | 0.049 | | |
| 14 | Inventive Example | 1.00 | | | | | | 0.0019 | |
| 15 | Inventive Example | 0.89 | | | | | | | 0.05 |
| 16 | Inventive Example | 1.03 | | | | | | | |
| 17 | Inventive Example | 0.95 | | | | | | | |
| 18 | Inventive Example | 1.02 | | | | | | | |
| 19 | Inventive Example | 0.95 | | | | | | | |
| 20 | Inventive Example | 0.98 | | | | | | | |
| 21 | Inventive Example | 1.01 | | | | | | 0.03 | |
| 22 | Inventive Example | 1.03 | | | | | | | |
| 23 | Inventive Example | 0.98 | | | | | | | |
| 24 | Inventive Example | 1.05 | | | | | | | |
| 25 | Comparative Example | 1.00 | | | | | | | |
| 26 | Comparative Example | 1.15 | | | | | | | |
| 27 | Comparative Example | 0.77 | | | | | | | |
| 28 | Comparative Example | 1.21 | | | | | | | |
| 29 | Comparative Example | 0.75 | | | | | | | |
| 30 | Comparative Example | 1.03 | | | | | | | |
| 31 | Comparative Example | 0.95 | | | | | | | |
| 32 | Comparative Example | 0.99 | | | | | | | |
| 33 | Comparative Example | 0.92 | | | | | | | |

| Steel number | Chemical composition (% by mass): Balance = Fe + impurities | | | | | | | Normalizing temperature (° C.) |
|---|---|---|---|---|---|---|---|---|
| | Bi | Mg | Zr | Te | Rare earth | Sn | In | |
| 1 | | | | | | | | 950 |
| 2 | | | | | | | | 950 |
| 3 | | | | | | | | 1000 |
| 4 | | | | | | | | 1000 |
| 5 | | | | | | | | 1050 |
| 6 | | | | | | | | 1000 |
| 7 | | | | | | | | 950 |
| 8 | | | | | | | | 950 |
| 9 | | | | | | | | 1000 |
| 10 | | | | | | | | 900 |
| 11 | | | | | | | | 950 |
| 12 | | | | | | | | 950 |
| 13 | | | | | | | | 1000 |
| 14 | | | | | | | | 1000 |
| 15 | | | | | | | | 950 |
| 16 | 0.02 | | | | | | | 1000 |
| 17 | | 0.0030 | | | | | | 950 |
| 18 | | | 0.0025 | | | | | 950 |
| 19 | | | | 0.0010 | | | | 950 |
| 20 | | | | | 0.0035 | | | 1000 |

TABLE 1-continued

| | | | |
|---|---|---|---|
| 21 | 0.0015 | | 1000 |
| 22 | | 0.03 | 1000 |
| 23 | | | 0.11 | 1000 |
| 24 | | | | 950 |
| 25 | | | | 960 |
| 26 | | | | 1000 |
| 27 | | | | 950 |
| 28 | | | | 1050 |
| 29 | | | | 950 |
| 30 | | | | 950 |
| 31 | | | | 950 |
| 32 | | | | 1000 |
| 33 | | | | 1000 |

\* The underlining for values indicates that the values are outside the scope of the present disclosure, and the blank spaces in columns of chemical composition indicate that element corresponding to the blank spaces were not intentionally added.

TABLE 2

| No. | Steel number | Class | Shot peening condition | Steel bar Number density of oxide particles (/cm$^2$) | Bearing steel part Number density of oxide particles (/cm$^2$) | Surface hardness HV | Compressive residual stress of rolling surface (MPa) | Retained γ amount (%) | Indentation resistant life (cycles) | Rolling fatigue life (cycles) |
|---|---|---|---|---|---|---|---|---|---|---|
| 1 | 1 | Inventive Example | A | 0.8 | 0.8 | 823 | 1150 | 8 | All survived | Survived |
| 2 | 2 | Inventive Example | A | 0.0 | 0.0 | 810 | 1336 | 6 | All survived | Survived |
| 3 | 3 | Inventive Example | A | 0.5 | 0.5 | 798 | 1099 | 5 | All survived | Survived |
| 4 | 4 | Inventive Example | A | 0.3 | 0.3 | 885 | 1410 | 9 | All survived | Survived |
| 5 | 5 | Inventive Example | A | 0.0 | 0.0 | 751 | 1530 | 3 | All survived | Survived |
| 6 | 6 | Inventive Example | A | 1.0 | 1.0 | 912 | 910 | 4 | All survived | Survived |
| 7 | 7 | Inventive Example | A | 0.0 | 0.0 | 881 | 1033 | 5 | All survived | Survived |
| 8 | 8 | Inventive Example | A | 0.0 | 0.0 | 856 | 1285 | 7 | All survived | Survived |
| 9 | 9 | Inventive Example | A | 0.5 | 0.5 | 827 | 1139 | 6 | All survived | Survived |
| 10 | 10 | Inventive Example | A | 0.8 | 0.8 | 836 | 1274 | 1 | All survived | Survived |
| 11 | 11 | Inventive Example | A | 0.3 | 0.3 | 877 | 1168 | 2 | All survived | Survived |
| 12 | 12 | Inventive Example | A | 0.0 | 0.0 | 805 | 1029 | 7 | All survived | Survived |
| 13 | 13 | Inventive Example | A | 0.0 | 0.0 | 841 | 1147 | 5 | All survived | Survived |
| 14 | 14 | Inventive Example | A | 0.5 | 0.5 | 839 | 1369 | 3 | All survived | Survived |
| 15 | 15 | Inventive Example | A | 0.0 | 0.0 | 845 | 1054 | 9 | All survived | Survived |
| 16 | 16 | Inventive Example | A | 0.0 | 0.0 | 819 | 1267 | 5 | All survived | Survived |
| 17 | 17 | Inventive Example | A | 0.3 | 0.3 | 838 | 1069 | 4 | All survived | Survived |
| 18 | 18 | Inventive Example | A | 0.0 | 0.0 | 855 | 1566 | 3 | All survived | Survived |
| 19 | 19 | Inventive Example | A | 0.0 | 0.0 | 799 | 1354 | 8 | All survived | Survived |
| 20 | 20 | Inventive Example | A | 0.5 | 0.5 | 860 | 1078 | 5 | All survived | Survived |
| 21 | 21 | Inventive Example | A | 0.3 | 0.3 | 812 | 1325 | 4 | All survived | Survived |
| 22 | 22 | Inventive Example | A | 0.5 | 0.5 | 823 | 1126 | 8 | All survived | Survived |
| 23 | 23 | Inventive Example | A | 1.3 | 1.3 | 798 | 1365 | 5 | All survived | Survived |
| 24 | 24 | Inventive Example | A | 3.0 | 3.0 | 1023 | 1533 | 6 | All survived | Survived |
| 25 | <u>25</u> | Comparative Example | None | <u>4.3</u> | <u>4.3</u> | 752 | <u>255</u> | 7 | 3.5 × 10^6 | 1.5 × 10^7 |
| 26 | <u>26</u> | Comparative Example | A | <u>3.3</u> | <u>3.3</u> | 845 | 1245 | 8 | 0.3 × 10^6 | Survived |
| 27 | <u>27</u> | Comparative Example | A | <u>3.3</u> | <u>3.3</u> | 833 | 1354 | 5 | 0.6 × 10^6 | Survived |
| 28 | <u>28</u> | Comparative Example | A | 0.8 | 0.8 | <u>680</u> | 903 | 5 | All survived | 3.3 × 10^7 |
| 29 | <u>29</u> | Comparative Example | A | 0.3 | 0.3 | <u>715</u> | 952 | 6 | All survived | 1.9 × 10^7 |
| 30 | <u>30</u> | Comparative Example | A | <u>3.8</u> | <u>3.8</u> | 771 | 1036 | 5 | 5.6 × 10^6 | Survived |
| 31 | <u>31</u> | Comparative Example | A | <u>4.5</u> | <u>4.5</u> | 753 | 1221 | 3 | 0.8 × 10^6 | Survived |
| 32 | <u>32</u> | Comparative Example | A | <u>3.5</u> | <u>3.5</u> | 823 | 1014 | 8 | 3.3 × 10^6 | Survived |
| 33 | <u>33</u> | Comparative Example | A | 0.8 | 0.8 | 840 | 1121 | 5 | 0.9 × 10^6 | 0.3 × 10^7 |
| 34 | 1 | Comparative Example | None | 0.8 | 0.8 | <u>721</u> | <u>378</u> | 3 | 1.1 × 10^6 | 1.3 × 10^7 |
| 35 | 18 | Comparative Example | B | 0.0 | 0.0 | 820 | <u>862</u> | 9 | 2.4 × 10^6 | Survived |
| 36 | 6 | Comparative Example | C | 1.0 | 1.0 | <u>740</u> | <u>754</u> | 9 | 1.5 × 10^6 | 2.1 × 10^7 |

*The underlining for values indicates that the values are outside the scope of the present disclosure.

Nos. 1 to 24, which are inventive examples, have an excellent indentation resistant life and an excellent rolling fatigue life, while retaining a Vickers hardness at a depth of 50 μm from the rolling surface that is equivalent to those of general bearing steel parts (Vickers hardness of 750 or more).

No. 25, which is a comparative example, is a commonly used SUJ2. No. 25, in which the chemical component content, the number density of oxide particles having an equivalent circle diameter of 5 μm or more and an $Al_2O_3$ content ratio of 50% by mass or more, and the compressive residual stress of the rolling surface were outside the ranges specified in the present disclosure, exhibited inferior results with respect to both of the indentation resistant life and the rolling fatigue life.

Nos. 26, 27, and 30 to 32, which are comparative examples, and in which the chemical component content, and the number density of oxide particles having an equivalent circle diameter of 5 μm or more and an $Al_2O_3$ content ratio of 50% by mass or more, were outside the ranges specified in the present disclosure, exhibited an inferior result with respect to the indentation resistant life.

Nos. 28 and 29, which are comparative examples, and in which the chemical component content was outside the range specified in the present disclosure, and in which the Vickers hardness at a depth of 50 μm from the rolling surface was low even after performing an appropriate shot peening, exhibited an inferior result with respect to the rolling fatigue life.

No. 33, which is a comparative example, and in which the chemical component content was out of the range specified in the present disclosure, exhibited inferior results with respect to both of the indentation resistant life and the rolling fatigue life.

No. 34, which is a comparative example, and in which the Vickers hardness at a depth of 50 μm from the rolling surface, and the compressive residual stress of the rolling surface were outside the ranges specified in the present disclosure due to absence of shot peening, exhibited inferior results with respect to both of the indentation resistant life and the rolling fatigue life.

No. 35, which is a comparative example, and in which the compressive residual stress of the rolling surface was outside the range specified in the present disclosure due to low air pressure and low coverage in shot peening, exhibited an inferior result with respect to the indentation resistant life.

No. 36, which is a comparative example, and in which the Vickers hardness at a depth of 50 μm from the rolling surface and the compressive residual stress of the rolling surface were outside the ranges specified in the present disclosure due to low shot particle hardness, low air pressure, and low coverage in shot peening, exhibited inferior results with respect to both of the indentation resistant life and the rolling fatigue life.

Bearing steel parts superior in indentation resistant life and retaining a surface hardness that is equivalent to those of general bearing steel parts can be obtained from the steel bars including the chemical components specified in steel numbers 1 to 24, by performing appropriate shot peening. Therefore, it is apparent that those steel bars are suitable for yielding such bearing steel parts.

The disclosure of Japanese Patent Application No. 2018-008180 are incorporated herein by reference in its entirety.

All documents, patent application, and technical standards mentioned in this specification are herein incorporated by reference to the same extent as if each individual document, patent application, or technical standard was specifically and individually indicated to be incorporated by reference.

The invention claimed is:

1. A bearing steel part comprising, in terms of % by mass:
C: 0.76 to 1.20%,
Si: 0.70 to 3.00%,
Mn: 0.10 to 2.00%,
Cr: 0.10 to 3.00%,
Mo: 0.001 to 0.100%,
S: 0.001 to 0.030%,
N: 0.004 to 0.020%,
Ca: 0.0002 to 0.0100%,
Al: 0.001 to 0.010%,
O: 0 to 0.005%,
P: 0 to 0.030%,
Ni: 0 to 3.00%,
Cu: 0 to 1.00%,
Co: 0 to 3.00%,
W: 0 to 1.00%,
V: 0 to 0.30%,
Ti: 0 to 0.300%,
Nb: 0 to 0.300%,
B: 0 to 0.0050%
Pb: 0 to 0.50%,
Bi: 0 to 0.50%,
Mg: 0 to 0.0100%,
Zr: 0 to 0.0500%,
Te: 0 to 0.1000%,
rare earth elements: 0 to 0.0050%,
Sn: 0 to 2.0%,
In: 0 to 0.50%, and
a balance consisting of Fe and impurities,
wherein a number density of oxide particles, which have an equivalent circle diameter of 5 μm or more, and comprise CaO, $Al_2O_3$ and $SiO_2$, such that a content ratio of $Al_2O_3$ with respect to a total mass of CaO, $Al_2O_3$, and $SiO_2$ is 50% by mass or more, is $3.0/cm^2$ or less in an arbitrary cross-section of the bearing steel part,
wherein a Vickers hardness at a depth of 50 μm from a rolling surface is 750 or more, and
wherein a compressive residual stress at the rolling surface is 900 MPa or more.

2. The bearing steel part according to claim 1, wherein, in terms of % by mass, the bearing steel part contains one or more elements selected from:
Ni: 0.01 to 3.00%,
Cu: 0.01 to 1.00%,
Co: 0.01 to 3.00%,
W: 0.01 to 1.00%,
V: 0.01 to 0.30%,
Ti: 0.001 to 0.300%,
Nb: 0.001 to 0.300%, and
B: 0.0001 to 0.0050%.

3. The bearing steel part according to claim 1, wherein, in terms of % by mass, the bearing steel part contains one or two or more elements selected from:
Pb: 0.01 to 0.50%,
Bi: 0.01 to 0.50%,
Mg: 0.0001 to 0.0100%,
Zr: 0.0001 to 0.0500%,
Te: 0.0001 to 0.1000%, and
rare earth elements: 0.0001 to 0.0050%.

4. The bearing steel part according to claim 1, wherein, in terms of % by mass, the bearing steel part contains one or two or more elements selected from:
Ni: 0.01 to 3.00%,
Cu: 0.01 to 1.00%,
Co: 0.01 to 3.00%,
W: 0.01 to 1.00%,
V: 0.01 to 0.30%,
Ti: 0.001 to 0.300%,
Nb: 0.001 to 0.300%, and
B: 0.0001 to 0.0050%; and
one or two or more elements selected from:
Pb: 0.01 to 0.50%,
Bi: 0.01 to 0.50%,
Mg: 0.0001 to 0.0100%,
Zr: 0.0001 to 0.0500%,
Te: 0.0001 to 0.1000%, and
rare earth elements: 0.0001 to 0.0050%.

* * * * *